United States Patent Office 3,804,860
Patented Apr. 16, 1974

3,804,860
CHEMICAL COMPOUNDS
Peter Bennett Johnson and Thomas Brian Lee, Loughborough, England, assignors to Fisons Limited, London, England
No Drawing. Filed Dec. 17, 1971, Ser. No. 209,349
Int. Cl. C07d 7/32
U.S. Cl. 260—345.2   9 Claims

ABSTRACT OF THE DISCLOSURE

There are described compounds of Formula I,

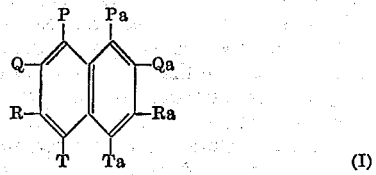

(I)

wherein an adjacent pair of the groups P, Q, R and T and an adjacent pair of the groups Pa, Qa, Ra and Ta each form a chain —COCH=C(COOH)—O— which may be bonded to the naphthalene nucleus in either sense, and
the remainder of P, Q, R, T, Pa, Qa, Ra and Ta, which may be the same or different, each represent hydrogen; alkyl; alkoxy; alkenyl; alkenyloxy; or substituted alkyl, alkoxy, alkenyl, or alkenyloxy carrying a hydroxy, alkoxy or halogen substituent; acyl; hydroxy; or halogen.

The compounds are suitable for use as anti-asthmatic pharmaceuticals and processes for making the compounds and compositions containing them are also described.

---

The present invention relates to new compounds, their preparation and compositions containing them.

According to our invention we provide compounds of Formula I,

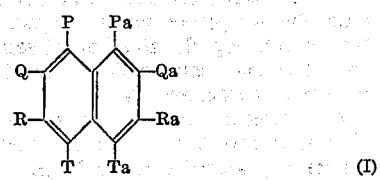

(I)

wherein an adjacent pair of the groups P, Q, R and T and an adjacent pair of the groups Pa, Qa, Ra and Ta each form a chain —COCH=C(COOH)—O— which may be bonded to the naphthalene nucleus in either sense, and
the remainder of P, Q, R, T, Pa, Qa, Ra and Ta, which may be the same or different, each represent hydrogen; alkyl; alkoxy; alkenyl; alkenyloxy; or substituted alkyl, alkoxy, alkenyl, or alkenyloxy carrying a hydroxy, alkoxy or halogen substituent; acyl; hydroxy; or halogen,
or a pharmaceutically acceptable derivative thereof.

According to our invention we also provide a process for the production of a compound of Formula I, or a pharmaceutically acceptable derivative thereof, which comprises,
(a) cyclizing a compound of Formula II,

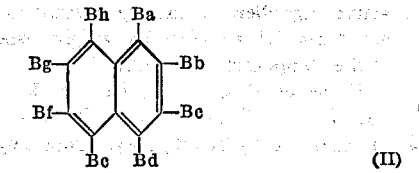

(II)

in which an adjacent pair of Ba, Bb, Bc and Bd and an adjacent pair of Be, Bf, Bg and Bh each represent the pair of groups Aa and Ab,
each pair of groups Aa and Ab represent a chain

—CO—CH=C(COOH)—O— or Ac and Ad, with the proviso that at least one of the pairs of groups Aa and Ab represent Ac and Ad, and Ac and Ad represent the pairs of groups
(i) —COCH$_2$COCOR″ and —OM, or
(ii) —H and —O—C(COOM)=CH—COOM
in which R″ represents an —OH group or a group which is hydrolyzable thereto,
M represents hydrogen or an alkali metal, and
the remainder of Ba to Bh, which may be the same or different, each have the same significances as the remainder of P, Q, R, T, Pa, Qa, Ra and Ta above, and
if necessary or desired hydrolyzing the group R″,
(b) Selectively hydrolyzing or oxidizing a compound of Formula III,

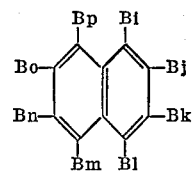

(III)

in which an adjacent pair of Bi to Bl and an adjacent pair of Bm to Bp each represent a chain Ae,
each chain Ae represents a chain

—CO—CH=C(COOH)—O— or —CO—CH=CD—O—, with the proviso that at least one of the chains Ae represents a chain

—CO—CH=CD—O—

D represents a group which is oxidizable or hydrolyzable to a —COOH group, and
the remainder of Bi to Bp, which may be the same or different, each have the same significances as the remainder of P, Q, R, T, Pa, Qa, Ra and Ta above, or (c) Dehydrogenating a compound of Formula IV,

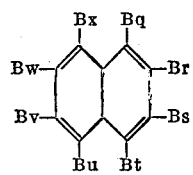

(IV)

in which an adjacent pair of Bq to Bt and an adjacent pair of Bu to Bx each represent a chain Af,
each chain Af represents a chain

—CO—CH=C(COOH)—O— or —CO—CH$_2$—CH(COOH)—O—, with the proviso that at least one of the chains Af represents a chain

—CO—CH$_2$—CH(COOH)—O—, and where desired or necessary converting the compound of Formula I to a pharmaceutically acceptable derivative thereof or vice versa.

The cyclization of process (a)(i) may be carried out by heating, or under basic or neutral conditions. It is however, preferred to carry out the cyclization in the presence of an acid, e.g. hydrochloric acid, and in a solvent which is inert under the reaction conditions, e.g. ethanol. The reaction may be carried out at from about 20° to 150° C. The group —COR″ is preferably an ester group, e.g. R″ may be a lower alkoxy group.

The cyclization of process (a)(ii) may be carried out by treating the appropriate compound of Formula II with a cyclizing agent, for example a dehydrating agent such as chlorosulphonic, polyphosphoric or sulphuric acid. The reaction is preferably carried out under anhydrous conditions and may be carried out at a temperature of from about 0° to 100° C. Alternatively cyclization may be achieved by converting the free carboxy groups of the compound of Formula II to acyl halide groups and subjecting the resulting acyl halide to an intramolecular Friedel-Crafts reaction.

In process (b) the group D may be, for example an ester, acid halide, amide or a nitrile group, which may be hydrolyzed to a —COOH group. The hydrolysis may be carried out using conventional techniques, for example under mildly basic conditions, e.g. using sodium carbonate, sodium hydroxide, sodium bicarbonate, or under acidic conditions, e.g. a mixture of aqueous dioxan and hydrochloric acid, or hydrogen bromide in acetic acid. The hydrolysis may be carried out at a temperature of from about 25° to 120° depending on the compounds used. Alternatively the group D may be an alkyl, e.g. a lower alkyl such as methyl, an aralkenyl, e.g. styryl, an acyl, e.g. a lower alkanoyl such as acetyl, or an aldehyde, e.g. formyl group. The oxidation may be carried out using conventional techniques which do not otherwise modify the molecule, for example an alkyl group may be oxidized using selenium dioxide, e.g. under reflux in aqueous dioxan; or chromic acid, e.g., under reflux in aqueous acetic acid. Aralkenyl groups may be oxidized using, for example neutral or alkaline potassium permanganate in aqueous ethanol, and acyl groups may be oxidized using, for example chromic acid or an aqueous hypochlorite, e.g. sodium hypochlorite. Aldehyde groups may be oxidized using, for example chromic acid or silver oxide.

In process (c) the dehydrogenation may be carried out by oxidation using a mild oxidizing agent, for example selenium dioxide, palladium black or chloranil, lead tetraacetate or triphenyl methyl perchlorate. Alternatively the dehydrogenation may be carried out indirectly by halogenation followed by dehydrohalogenation, e.g. by treatment with N-bromosuccinimide or pyridinium bromide perbromide to yield the 3-bromo derivative which is subsequently dehydrobrominated. The reaction may be carried out in a solvent which is inert under the reaction conditions, e.g. a halogenated hydrocarbon, xylene, or glacial acetic acid. The reaction may be carried out at an elevated temperature, e.g. from 25 to 150° C.

The compounds of Formulae II, III and IV may be made from known starting materials using techniques known for the production of similar known substances (see for example published Dutch patent specification No. 6811740 and British patent specification No. 1,230,087).

The compounds of Formula I and the intermediates therefore may be isolated from their reaction mixtures using conventional techniques.

Pharmaceutically acceptable derivatives of the compounds of Formula I include pharmaceutically acceptable salts, esters and amides of the 2-carboxylic acid group. Suitable salts include ammonium, alkali metal (e.g. sodium potassium and lithium) and alkaline earth metal salts (e.g. calcium or magnesium), and salts with suitable organic bases, e.g. salts with lower alkylamines such as methylamine or ethylamine, with substituted lower alkylamines, e.g. hydroxy substituted alkylamines or with simple 5 or 6 membered monocyclic nitrogen heterocyclic compounds, e.g. piperidine or morpholine. Suitable esters include simple lower alkyl esters, basic esters derived from alcohols containing basic groups, e.g. di-lower alkyl amino substituted alkanols, and acyloxy alkyl ester, e.g. a lower alkanoyloxy-lower alkyl ester, or a bis-ester derived from a di-hydroxy compound, e.g. a di(hydroxy-lower alkyl) ether. The pharmaceutically acceptable salts of the basic esters, e.g. the hydrochloride, may also be used. The esters may be made by conventional techniques, e.g. esterification, transesterification or reaction of the acid, or a salt thereof, with an appropriate compound containing a good leaving group.

Thus our invention also provides a process for the production of a pharmaceutically acceptable salt of a compound of Formula I, which comprises treating a compound of Formula I, another salt thereof, or an ester or amide thereof, with an appropriate base or salt. The pharmaceutically acceptable salt is preferably the di-sodium salt.

The compounds of Formula I and pharmaceutically acceptable derivatives thereof are useful because they possess pharmacological activity in animals; in particular they are useful because they inhibit the release and/or action of pharmacological mediators which result from the in vivo combination of certain types of antibody and specific antigen e.g. the combination of reaginic antibody with specific antigen (see Example A). In man, both subjective and objective changes which result from the inhalation of specific antigen by sensitized subjects are inhibited by prior administration of the new compounds. Thus the new compounds are useful in the treatment of asthma, e.g. allergic asthma. The new compounds are also useful in the treatment of so-called "intrinsic" asthma (in which no sensitivity to extrinsic antigen can be demonstrated). The new compounds are also of value in the treatment of other conditions in which antigen-antibody reactions are responsible for disease, for example, hay fever, urticaria and certain other allergic skin diseases.

For the above mentioned uses the dosage administered will, of course, vary with the compound employed, the mode of administration and the treatment desired. However, in general, satisfactory results are obtained when the compounds are administered at a dosage of from 0.1 to 50 mg. per kg. of animal body weight in the test set out in Example A. For man the indicated total daily dosage is in the range of from about 1 mg. to 3,500 mg. which may be administered in divided doses from 1 to 6 times a day or in sustained release form. Thus unit dosage forms suitable for administration (by inhalation or oesophageally) comprise from about 0.17 mg. to 600 mg. of the compound admixed with a solid or liquid pharmaceutically acceptable diluent, carrier or adjuvant.

The preferred compounds of Formula I, and pharmaceutically acceptable derivatives thereof (and in particular the salts, e.g. the alkali metal salts, thereof) have the advantage that they are absorbed and are active when administered oesophageally.

According to our invention we also provide a pharmaceutical composition comprising (preferably a minor proportion of) a compound of Formula I, or a pharmaceutically acceptable derivative thereof, in combination with a pharmaceutically acceptable adjuvant, diluent or carrier. Examples of suitable adjuvants, diluents or carriers are: for tablets and dragées; lactose, starch, talc or stearic acid; for capsules, tartaric acid or lactose; for suppositories; natural or hardened oils or waxes; for inhalation compositions; coarse lactose. For use in inhalation compositions the compound of Formula I, or the pharmaceutically acceptable derivatives thereof, preferably has a particle size of from 0.01 to 10 microns. The compositions may also contain suitable preserving, stabilizing and wetting agents, solubilizers, sweetening and coloring agents and flavorings. The compositions may, if desired, be formulated in sustained release form.

It may be desirable to incorporate one or more other active ingredients with the compound of Formula I, for example a bronchodilator such as isoprenaline and salts thereof, notably the sulphate. When present, the other active ingredient is usually present in a minor amount, e.g. from 0.1 to 10% by weight based on the amount of the compound of Formula I.

Those of P, Q, R, T, Pa, Qa, Ra and Ta which do not form a —CH—CH=C(COOH)—O— chain may be, for example hydrogen; alkyl containing from 1 to 8 carbon atoms, e.g. methyl; alkoxy containing from 1 to 8 carbon atoms, e.g. methoxy; alkenyl containing from 2 to 8 carbon atoms, e.g. allyl; alkenyloxy containing from 2 to 8 carbon atoms, e.g. allyoxy; hydroxy- or chloro-alkyl or hydroxy- or chloro-alkoxy containing 1 to 8 carbon atoms, e.g. hydroxymethoxy; hydroxy- or chloro-alkenyl or hydroxy- or chloro-alkenyloxy containing from 2 to 8 carbon atoms, e.g. 2-bromoallyloxy; alkoxy-alkyl in which both the alkyl and alkoxy group contain from 1 to 8 carbon atoms, e.g. ethoxy-ethyl; alkoxy-alkoxy in which both the alkoxy groups contain from 1 to 8 carbon atoms, e.g. ethoxy-ethoxy; alkoxy-alkenyl or alkoxy-alkenyloxy in which the alkoxy group contains from 1 to 8 carbon atoms and the alkenyl or alkenyloxy group contains from 2 to 8 carbon atoms; acyl, e.g. alkanoyl, containing 2 to 8 carbon atoms; hydroxy; chloro- or bromo.

It is preferred that those of P, Q, R, T, Ra, Qa, Ra and Ta, which do not form —CO—CH=C(COOH)—O— chains, be hydrogen or an acyl, e.g. an alkanoyl group. It is also preferred that any substituent P, Q, R, T, Pa, Qa, Ra and Ta does not contain more than 6 carbon atoms.

The invention is illustrated, but in no way limited by the following examples in which the parts and percentages are by weight unless otherwise stated.

EXAMPLE 1

2,8-dicarboxy-4,10-dioxo-4H,10H-1-benzopyrano[6,5-f]-1-benzopyran hemihydrate (a) 1,5-diacetyl-2,6-dihydroxy naphthalene: An intimate mixture of 5 parts of 2,6-diacetoxynaphthalene, 5 parts of sodium chloride and 25 parts of anhydrous aluminium chloride was heated at 140° C. for 4 hours. After cooling the mixture was hydrolyzed with ice and hydrochloric acid.

The resulting solid was filtered off, washed with water and dissolved in dilute sodium hydroxide solution. The alkaline solution was filtered and acidified with hydrochloric acid to give a solid, which was filtered off, washed with water, dried and crystallized from ethanol to give 2.1 parts of a yellow solid, M.P. 254–6° C. comprising 1,5-diacetyl-2,6-dihydroxynaphthalene.

Analysis.—Found (percent): C, 68.9; H, 4.95. $C_{14}H_{12}O_4$ requires (percent): C, 68.85; H, 4.92.

The structure was confirmed by nuclear magnetic resonance and mass spectroscopy.

(b) 2,8 - dicarboxy - 4,10 - dioxo-4H,10H-1-benzopyran[6,5-f]-1-benzopyran diethyl ester hemihydrate: To a stirred solution of 3.8 parts of sodium in 100 parts of dry ethanol at room temperature was added a slurry of 5 parts of 1,5-diacetyl-2,6-dihydroxynaphthalene in 15 parts of diethyl oxalate and 200 parts of dioxan. The mixture was stirred and refluxed for 4 hours, cooled and poured into water. The solution was extracted with diethyl ether and the aqueous phase was acidified with hydrochloric acid and extracted with diethyl ether.

The ethereal extracts were washed with water, dried and evaporated to give an oil to which ethanol was added. A small amount of solid was filtered off and the ethanolic solution was boiled with 1 part of hydrochloric acid for ½ hour. The solid which precipitated was filtered off and crystallized from dioxan to give 1.1 parts of 2,8-dicarboxy-4,10 - dioxo - 4H,10H-1-benzopyrano[6,5-f]-1-benzopyran diethyl ester hemihydrate, M.P. 277° C.

Analysis.—Found (percent): C, 63.0; H, 3.84. $C_{22}H_{16}O_8 \cdot \frac{1}{2}H_2O$ requires (percent): C, 63.3; H, 4.07.

The structure was confirmed by mass spectroscopy.

(c) 2,8-dicarboxy - 4,10 - dioxo-4H,10H-1-benzopyrano-[6,5-f]-1-benzopyran hemihydrate. To a solution of 0.5 part of 2,8-dicarboxy-4,10-dioxo-4H,10H-1-benzopyrano-[6,5-f]-1-benzopyran diethyl ester hemihydrate in 50 parts of dioxan were added 0.21 part of sodium hydrogen carbonate. Water was then added to the boiling mixture until a solution was obtained. The solution was boiled for 1 hour and evaporated to dryness. The resulting solid was dissolved in water and filtered. The filtrate was acidified with hydrochloric acid to give a white solid which was filtered off, washed with water and dried to give 0.4 part of 2,8-dicarboxy-4,10-dioxo-4H,10H - 1 - benzopyrano[6,5-f]-1-benzopyran hemihydrate, M.P. >300° C.

Analysis.—Found (percent): C, 59.5; H, 2.14. $C_{18}H_8O_8 \cdot \frac{1}{2}H_2O$ requires (percent): C, 59.5; H, 2.49.

(d) 2,8 - dicarboxy - 4,10 - dioxo-4H,10H-1-benzopyrano[6,5-f]-1-benzopyran disodium salt: To a solution of 0.13 part of sodium hydrogen carbonate in 50 parts of water were added 0.28 part of 2,8-dicarboxy-4,10-dioxo-4H,10H-1-benzopyrano[6,5-f] - 1 - benzopyran hemihydrate. The resulting solution was filtered and freeze-dried to give 2,8-dicarboxy-4,10-dioxo-4H,10H-1-benzopyrano-[6,5-f]-1-benzopyran as the disodium salt.

EXAMPLE 2

3,16-dicarboxy-1,8-dioxo-1H,8H-1-benzopyrano[7,6-f]-1-benzopyran (a) 1,6-diacetyl-2,7-dihydroxynaphthalene: An intimate mixture of 5 parts of 2,7-diacetoxynaphthalene, 5 parts of sodium chloride and 25 parts of anhydrous aluminium chloride was heated at 145–155° C. for 2 hours. After cooling, the mixture was hydrolyzed with ice and hydrochloric acid and the resulting solid was filtered off and dissolved in dilute sodium hydroxide solution.

The alkaline solution was filtered and acidified with hydrochloric acid to give a solid which was filtered off, washed with water, dried and crystallized from ethanol to give 2.6 parts of a yellow solid comprising 1,6-diacetyl-2,7-dihydroxynaphthalene, M.P. 264–5° C.

Analysis.—Found (percent): C, 69.3; H, 4.75. $C_{14}H_{12}O_4$ requires (percent): C, 68.85; H, 4.92.

The structure was confirmed by nuclear magnetic resonance and mass spectroscopy.

(b) 3,10 - dicarboxy - 1,8 - dioxo-1H,8H-1-benzopyrano[7,6-f]-1-benzopyran diethyl ester: To a stirred solution of 3.8 parts of sodium in 100 parts of ethanol was added a slurry of 5 parts of 1,6-diacetyl-2,7-dihydroxynaphthalene in 15 parts of diethyl oxalate and 200 parts of dioxan at room temperature. The mixture was refluxed for 20 hours.

After cooling it was poured into water and the resulting solution was extracted with diethyl ether. The aqueous extracts were acidified with hydrochloric acid and extracted with diethyl ether. The ethereal extracts were washed with water, dried over sodium sulphate and evaporated to give an oil. The oil was dissolved in ethanol and the solution was boiled with 1 part of concentrated hydrochloric acid for 1 hour. After standing at room temperature for several days a solid was precipitated, which was filtered off, dissolved in sodium hydrogen carbonate solution and reprecipitated with hydrochloric acid. It was then esterified by refluxing for 18 hours with 100 parts of ethanol and 1 part of concentrated sulphuric acid to give 0.4 part of 3,10-dicarboxy - 1,8 - dioxo-1H,8H-1-benzopyrano[7,6-f]-1-benzopyran diethyl ester, M.P. 270° C. (decomp.) as a yellow solid.

Analysis.—Found (percent): C, 65.3; H, 4.23; $C_{22}H_{16}O_8$ requires (percent): C, 64.7; H, 3.92.

The structure was confirmed by mass spectroscopy.

(c) 3,10-dicarboxy - 1,8 - dioxo-1H,8H-1-benzopyrano [7,6-f]-1-benzopyran: 0.2 part of 3,10-dicarboxy-1,8-dioxo-1H,8H-1-benzopyrano[7,6-f] - 1 - benzopyran diethyl ester were suspended in 100 parts of boiling ethanol. 0.14 part of sodium hydrogen carbonate were added and then water until a solution was obtained. The solution was boiled for half an hour and the ethanol was distilled off under vacuum. The aqueous solution was then acidified with hydrochloric acid to give 0.13 part of a solid comprising 3,10-dicarboxy-1,8-dioxo-1H,8H - 1 - benzopyrano [7,6-f]-1-benzopyran, M.P. >300° C.

(d) 3,10-dicarboxy - 1,8 - dioxo-1H,8H-1-benzopyrano[7,6-f]-1-benzopyran disodium salt: To a solution of 0.047 part of sodium hydrogen carbonate in 50 parts of water were added .09 part of 3,10-dicarboxy-1,8-dioxo-1H,8H-1-benzopyrano[7,6-f]-1-benzopyran. The solution was filtered and freeze-dried to give a solid comprising 3,10-dicarboxy-1,8-dioxo-1H,8H - 1 - benzopyrano[7,6-f]-1-benzopyran disodium salt.

EXAMPLE 3

5-acetyl-3,9-dicarboxy-1,7-dioxo-1H,7H-1-benzopyrano[8,7-h]-1-benzopyran (a) 1,5-dihydroxy-2,6,8-triacetylnaphthalene: An intimate mixture of 5 parts of 1,5-diacetoxynaphthalene, 5 parts of sodium chloride and 25 parts of anhydrous aluminium chloride was heated at 155° C. for 3 hours. After cooling, the mixture was hydrolyzed with ice and hydrochloric acid to give a solid which was filtered off, washed with water and dissolved in dilute sodium hydroxide solution. Acidification of the alkaline solution with hydrochloric acid gave a brown solid which was filtered off, washed, dried and extracted with benzene in a Soxhlet apparatus. Evaporation of the benzene solution gave a solid which was crystallized from ethanol to give 0.5 part of a yellow solid comprising 1,5-dihydroxy 2,6,8-triacetylnaphthalene, M.P. 244–6° C.

*Analysis.*—Found (percent): C, 67.2; H, 4.90. $C_{16}H_{14}O_5$ requires (percent): C, 67.1; H, 4.95.

The structure was confirmed by nuclear magnetic resonance and mass spectroscopy.

(b) 5 - acetyl-3,9-dicarboxy-1,7-dioxo-1H,7H-1-benzopyrano[8,7-h]-1-benzopyran: To a stirred solution of 1.84 parts of sodium in 50 parts of ethanol was added a slurry of 2.3 parts of 1,5-dihydroxy-2,6,8-triacetylnaphthalene in 8.76 parts of diethyl oxalate and 50 parts of dioxan at room temperature.

The mixture was refluxed for 5 hours, cooled and diluted with diethyl ether. The resulting sodium salt was filtered off, washed with diethyl ether, dissolved in water and filtered.

The aqueous solution was acidified with dilute hydrochloric acid and extracted with diethyl ether. The ethereal solution was washed with water, dried over sodium sulphate and evaporated to give an oil.

To a solution of the oil in ethanol were added 3 drops of concentrated hydrochloric acid. It was then boiled for 15 minutes. The yellow solid which precipitated was filtered off. Examination of the solid by thin layer chromatography showed a mixture of chromone acid and ester. To a suspension of 0.55 part of the solid in 100 parts of boiling ethanol were added 0.3 part of sodium bicarbonate. Water was then added until a clear solution was obtained. The solution was boiled for half an hour and the ethanol was evaporated. Acidification of the aqueous solution with hydrochloric acid gave a solid comprising 0.45 part of 5 - acetyl-3,9-dicarboxy-1,7-dioxo-1H,7H-1-benzopyrano[8,7-h]-1-benzopyran, M.P. 309–310° C.

(c) 5 - acetyl-3,9-dicarboxy-1,7-dioxo-1H,7H-1-benzopyrano[8,7-h]-1-benzopyran diethyl ester monohydrate: A mixture of 0.25 part of 5-acetyl-3,9-dicarboxy-1,7-dioxo-1H,7H-1-benzopyrano[8,7-h]-1-benzopyran, 50 parts of ethanol and 2 parts of concentrated sulphuric acid was refluxed for 12 hours. After partial evaporation and subsequent cooling, 0.2 part of a pale yellow solid were obtained comprising 5 - acetyl-3,9-dicarboxy-1,7 dioxo-1H,7H-1-benzopyrano[8,7-h] - 1 - benzopyran diethyl ester monohydrate, M.P. 212° C. decomp.

The structure was confirmed by mass spectroscopy.

*Analysis.*—Found (percent) C, 61.9; H, 3.9. $C_{24}H_{18}O_9 \cdot H_2O$ requires (percent): C, 61.5; H, 4.30.

(d) 5 - acetyl-3,9-dicarboxy-1,7-dioxo-1H,7H-1-benzopyrano[8,7-h]-1-benzopyran disodium salt: To a solution of 0.11 part of sodium hydrogen carbonate in 50 parts of water were added 0.26 part of 5-acetyl-3,9-dicarboxy-1,7-dioxo-1H,7H-1-benzopyrano[8,7-h]-1 - benzopyran. The resulting solution was filtered and freeze-dried to give 5-acetyl - 3,9 - dicarboxy-1,7 dioxo-1H,7H-1-benzopyrano[8,7-h]-1-benzopyran as a pale yellow disodium salt.

EXAMPLE A

The procedure set out below may be used to assess the effectiveness of a compound in inhibiting the release of the pharmacological mediators of anaphylaxis.

In this test, the effectiveness of the compounds in inhibiting the passive cutaneous anaphylactic reaction in rats is assessed. It has been proved that this form of test gives reliable qualitative indications of the ability of the compounds under test to inhibit antibody-antigen reactions in man.

In this test method Charles River France/Fisons bred rats (male or female) having a body weight of from 100 to 150 gms. are infected subcutaneously at weekly intervals with *N. brasiliensis* larvae in doses increasing from about 2000 larvae per animal to 12,000 larvae per animal in order to establish the infection. After 8 weeks the rats are bled by heart puncture and 15–20 mls. of blood are collected from each animal. The blood samples are then centrifuged at 3500 r.p.m. for 30 minutes in order to remove the blood cells from the blood plasma. The serum is collected and used to provide a serum containing *N. brasiliensis* antibody. A pilot sensitivity test is carried out to determine the least quantity of serum required to give a skin weal in control animals in the test described below of 2 cm. diameter. It has been found that optimum sensitivity of rats in the body weight range 100–130 gms. is obtained using a serum diluted with eight parts of physiological saline solution. This diluted solution is called antibody serum A.

The antigen to react with the antibody in serum A is prepared by removing *N. brasiliensis* worms from the gut of the infested rats, centrifuging the homogenate and collecting the supernatent liquor. This liquor is diluted with saline to give a protein content of 1 mg./ml. and is known as solution B.

Charles River France/Fisons bred rats in the body weight range 100 to 130 gms. are sensitized by intra dermal injection of 0.1 mls. of serum A into the right flank. Sensitivity is allowed to develop for 24 hours and the rats are then injected intravenously with 1 ml./100 gms. body weight of a mixture of solution B (0.25 mls.), Evans Blue dye solution (0.25 mls.) and the solution of the compound under test (0.5 mls. with varying percentages of active matter). Insoluble compounds are administered as a separate intraperitoneal injection 5 minutes before intravenous administration of solution B and Evans Blue dye. For each percentage level of active matter in the solution under test five rats are injected. Five rats are used as controls in each test. The dosages of the compound under test are selected so as to give a range of inhibition values.

Thirty minutes after injection of solution B the rats are killed and the skins are removed and reversed. The intensity of the anaphylactic reaction is assessed by comparing the size of the characteristic blue weal produced by spread of the Evans Blue dye from the sensitization site, with the size of the weal in the control animals. The size of the weal is rated as 0 (no weal detected, i.e. 100% inhibition) to 4 (no difference is size of weal, i.e. no inhibition) and the percentage inhibition for each dose level calculated as:

Percent inhibition
$$= \frac{(\text{Control group score} - \text{treated group score}) \times 100}{\text{Control group score}}$$

The percentage inhibitions for the various dose levels are plotted graphically for each compound. From these graphs the dosage required to achieve a 50% inhibition of the anaphylactic reaction ($ID_{50}$) may be determined.

The compounds are also evaluated in the above manner using intestinal and gastric administration of the compound.

We claim:
1. A compound of Formula I

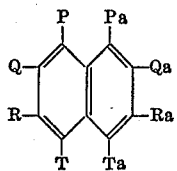

(I)

wherein an adjacent pair of the groups P, Q, R and T and an adjacent pair of the groups Pa, Qa, Ra and Ta each form a chain —COCH=C(COOH)—O— which may be bonded to the naphthalene nucleus in either sense, and the remainder of P, Q, R, T, Pa, Qa, Ra and Ta, which may be the same or different, each represent hydrogen; alkyl; alkoxy; alkenyl; alkenyloxy; or alkyl, alkoxy, alkenyl, or alkenyloxy, each of which is substituted by hydroxy, alkoxy or halogen alkanoyl; hydroxy or halogen, the alkyl and alkoxy groups each being from 1 to 8 carbon atoms and the alkenyl, alkenyloxy and alkanoyl groups each being from 2 to 8 carbon atoms.

2. A compound according to claim 1, wherein those P, Q, R, T, Pa, Qa, Ra and Ta which do not form a —CH—CH=C(COOH)—O— chain may be hydrogen; alkyl of from 1 to 8 carbon atoms; alkoxy of from 1 to 8 carbon atoms; alkenyl of from 2 to 8 carbon atoms; alkenyloxy of from 2 to 8 carbon atoms; hydroxy- or chloro-alkyl or hydroxy- or chloro-alkoxy of 1 to 8 carbon atoms; hydroxy- or chloro-alkenyl or hydroxy- or chloro-alkenyloxy of from 2 to 8 carbon atoms; alkoxy-alkyl in which both the alkyl and alkoxy group are from 1 to 8 carbon atoms; alkoxy-alkoxy in which both the alkoxy groups are from 1 to 8 carbon atoms; alkoxy-alkenyl or alkoxy-alkenyloxy in which the alkoxy group is from 1 to 8 carbon atoms and the alkenyl or alkenyloxy group is from 2 to 8 carbon atoms; alkanoyl of from 2 to 8 carbon atoms; hydroxy; chloro or bromo.

3. A compound according to claim 1, wherein those of P, Q, R, T, Pa, Qa, Ra and Ta, which do not form —CO—CH=C(COOH)—O— chains, are hydrogen or alkanoyl of from 2 to 8 carbon atoms.

4. A compound according to claim 1 which is 2,8-dicarboxy-4,10-dioxo-4H,10H-1-benzopyrano[6,5-f]-1-benzopyren.

5. A compound according to claim 1 which is 3,10-dicarboxyl-1,8-dioxo-1H,8H-1-benzopyrano[7,6,-f]-1-benzopyran.

6. A compound according to claim 1 which is 5-acetyl-3,9-dicarboxy-1,7-dioxo-1H,7H-1-benzopyrano[8,7-h]-1-benzopyran.

7. A compound according to claim 1 in the form of a pharmaceutically acceptable salt thereof.

8. A compound according to claim 1 in the form of the di-sodium salt thereof.

9. A compound according to claim 1 in the form of a pharmaceutically acceptable salt, lower alkyl ester, ester with a di-lower akyl amino lower alkanol, a lower alkanoyl-lower alkyl ester, an ester with a di(hydroxy-lower alkyl) ether, or the unsubstituted amide thereof.

References Cited
UNITED STATES PATENTS 3,632,607    1/1972    Meyer ------------ 260—345.2

JOHN M. FORD, Primary Examiner

U.S. Cl. X.R.

424—283

UNITED STATES PATENT OFFICE
CERTIFICATE OF CORRECTION

Patent No. 3,804,860              Dated April 16, 1974

Inventor(s) Peter Bennett Johnson and Thomas Brian Lee

It is certified that error appears in the above-identified patent and that said Letters Patent are hereby corrected as shown below:

Page one, first column, in the heading, insert the following:

-- Foreign Application Priority Data

December 30, 1970    Great Britain    61915/70 --.

Signed and sealed this 13th day of August 1974.

(SEAL)
Attest:

McCOY M. GIBSON, JR.          C. MARSHALL DANN
Attesting Officer             Commissioner of Patents